(12) United States Patent
Lloyd et al.

(10) Patent No.: US 6,792,212 B1
(45) Date of Patent: Sep. 14, 2004

(54) SPACECRAFT DATA ACQUISITION AND DISTRIBUTION INTERFACE

(75) Inventors: David W. Lloyd, Manhattan Beach, CA (US); Alexander Mihich, Manhattan Beach, CA (US); William D. Lemke, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/352,386

(22) Filed: Jul. 13, 1999

Related U.S. Application Data

(63) Continuation-in-part of application No. 08/874,458, filed on Jun. 17, 1997, now Pat. No. 6,252,691.

(51) Int. Cl.[7] .............................................. H04B 10/00
(52) U.S. Cl. ................... 398/124; 244/158 R; 398/121; 398/122; 701/13
(58) Field of Search ................................ 359/142–144, 359/172, 154, 164, 173, 163; 244/158 R; 701/13

(56) References Cited

U.S. PATENT DOCUMENTS

| | | | | |
|---|---|---|---|---|
| 4,816,823 A | * | 3/1989 | Polkinghorne et al. | ........ 370/85 |
| 5,271,582 A | * | 12/1993 | Perkins et al. | .......... 244/158 R |
| 5,548,769 A | * | 8/1996 | Baum et al. | ................. 395/800 |
| 5,951,609 A | * | 9/1999 | Hanson et al. | ................. 701/13 |
| 6,057,949 A | * | 5/2000 | Kinstler | |
| 6,252,691 B1 | * | 6/2001 | Porzucki et al. | ............. 359/172 |
| 6,298,289 B1 | * | 10/2001 | Lloyd et al. | .................. 701/13 |
| 6,330,093 B1 | * | 12/2001 | Eller et al. | ................... 359/172 |

* cited by examiner

*Primary Examiner*—Brent A. Swarthout
(74) *Attorney, Agent, or Firm*—Terje Gudmestad

(57) ABSTRACT

A spacecraft data acquisition system comprises a telemetry and command controller, a payload unit, and a bi-directional interface that couples the telemetry and command controller to the payload unit. The interface is a single bi-directional interface that is used to reduce the complexity of the spacecraft. The transmission of information over the interface has a predetermined protocol so that the telemetry and command controller and payload unit may effectively use the single interface.

13 Claims, 5 Drawing Sheets

SPACECRAFT DATA ACQUISITION AND DISTRIBUTION INTERFACE

RELATED APPLICATION

The present application is a continuation-in-part (CIP) application of application Ser. No. 08/874,458, filed Jun. 17, 1997, now U.S. Pat. No. 6,252,691 B1 entitled "INTRA-SATELLITE WIRELESS COMMUNICATION", which is incorporated by reference herein.

TECHNICAL FIELD

The present invention relates to space and communications satellites, and more particularly, to a data distribution interface for satellites.

BACKGROUND ART

Spacecraft electronics typically include a spacecraft processor coupled to multiple payload units. Each payload unit contains electronics which receive commands from and provide telemetry to the spacecraft command, control, and telemetry subsystem. Known satellites use multiple hard-wire techniques for the distribution of commands and acquisition of telemetry signals between various units and subsystems. This signal distribution method has many disadvantages including a large wire harness that is relatively expensive and heavy. The signal distribution method is also susceptible to noise and electrostatic discharge that are commonly experienced in space. Because of the complexity of the wiring associated with such a signal distribution method, testing and troubleshooting are time consuming and costly.

One type of embedded control module is called an essential services node (ESN) and is implemented in a multi-chip module. The ESN requires significant power to operate and a significant number of external components outside the multi-chip module such as transformers and couplers. The ESN also requires a shielded, twisted pair cable. The ESN also requires a tightly regulated secondary voltage input. These requirements significantly increase the cost of the ESN to a point where it may be cost prohibitive for many commercial applications.

SUMMARY OF THE INVENTION

It is, therefore, one object of the invention to reduce the wiring harness complexity and integration cycle time for a satellite. It is a further object of the invention to reduce spacecraft cost and weight.

The present invention allows the payload wiring harness to be a premanufactured item not dependent on the payload layout and the satellite unit configuration.

In one aspect of the invention, a satellite has a telemetry and command controller coupled to multiple payload units. Each payload unit includes an embedded, mixed-signal application-specific integrated circuit (ASIC) which acts as a telemetry acquisition and command distribution device. A single bi-directional interface couples the telemetry and command controller to the ASIC.

In another aspect of the invention, a single wire is used for the bi-directional interface. The bi-directional interface may also be a wireless optical interface.

In a further aspect of the invention, a method of operating a spacecraft comprises the steps of: sending a request signal from a telemetry and command controller into a single transmit and receive connection interface; receiving the request from the single transmit and receive interface into a payload unit; processing the request in the payload unit; and replying to the request through the single transmit and receive interface.

One advantage of the invention is that the complexity of the spacecraft is significantly reduced and, therefore, the reliability of the spacecraft is also increased.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
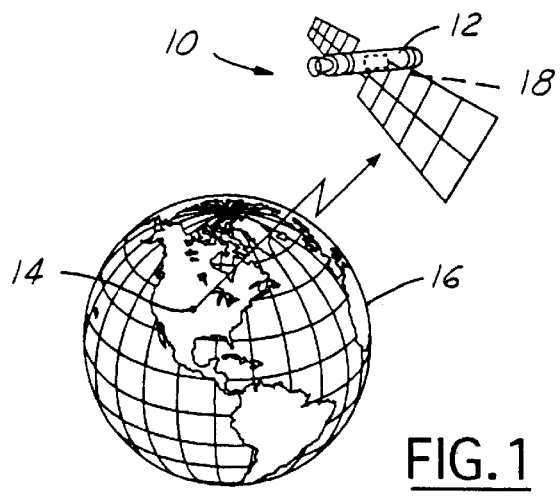
FIG. 1 is a view of a satellite in the deployed configuration in which the present invention is applicable.

Referring now to FIG. 1, a satellite system 10 formed according to the present invention has a satellite 12 that communicates with a ground station 14 on the face of earth 16. Although only one satellite 12 is illustrated, the system may be used with various number of satellites in a network as well as various types of satellites such as geostationary, low earth orbit, middle earth orbit, or a high earth orbit satellite.

Satellite 12 has satellite electronics 18 that are used to control the satellite in terms of telemetry, command and control. Satellite electronics 18 may, for example, include a spacecraft processor and multiple embedded services modules as will be further described below.

The present invention is a bi-directional serial interface between the spacecraft processor and embedded services modules. The bi-directional serial interface may be implemented in a wiring harness that is significantly reduced in complexity from those known in the art.

Figure 2:
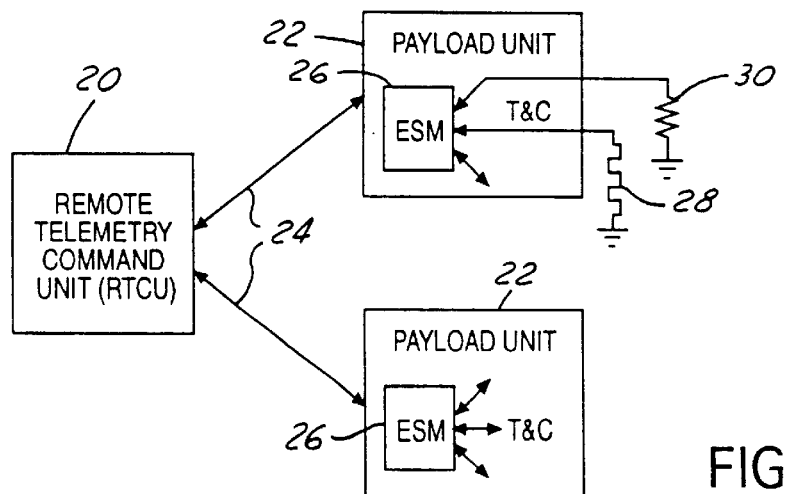
FIG. 2 is a block diagram of a remote telemetry and command unit coupled to a payload unit according to the present invention.

Referring now to FIG. 2, a remote telemetry and command unit 20 is coupled to a plurality of payload units 22. While only two payload units are shown, various numbers of payload units may be coupled to remote telemetry and command unit 20. Remote telemetry and command unit 20 is coupled to each payload unit by an interface 24. Interface 24 is a single wire serial interface. For example, interface 24 may use a single unshielded 30-gauge wire. However, other types of interfaces may be incorporated such as an optical fiber, an RF air link or RF on DC.

Payload unit 22 has an embedded services module (ESM) 26. As will be further described below, embedded services module 26 may be coupled to various payloads such as a heater 28 and a temperature sensor 30 to provide feedback for regulating the operation of heater 28 payload elements. These elements could include voltage, currrent, or power measuring devices, switches, variable gain amplifiers, attenuators, heaters, and temperature sensors.

Figure 3:
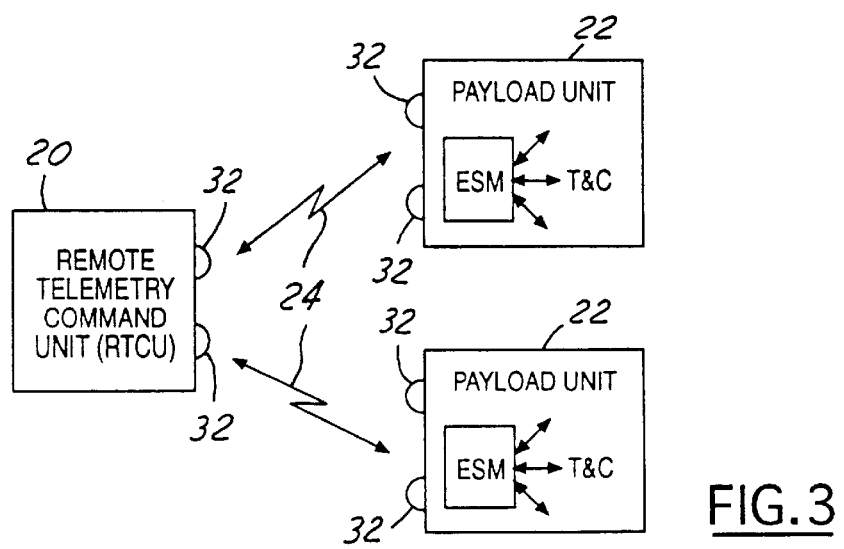
FIG. 3 is an alternative embodiment of an remote telemetry and command unit coupled to a payload unit.

Referring now to FIG. 3, interface 24 may be an optical interface using infrared. To couple remote telemetry and command unit 20 and payload unit 22, an optical transceiver 32 may be coupled to remote telemetry and command unit 20 and payload unit 22. Coded optical signals may then be passed between the remote telemetry and command unit and payload unit to provide appropriate communications.

Figure 4:
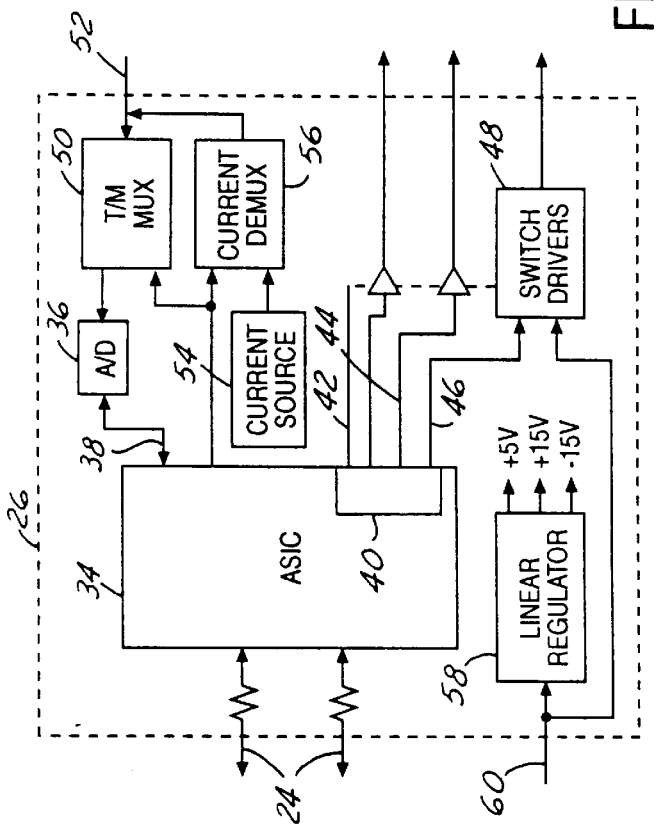
FIG. 4 is a block diagram of an embedded services module according to the present invention.

Referring now to FIG. 4, a high-level block diagram of embedded services module 26 is illustrated. Embedded services module 26 has a control circuit 34. Control circuit 34 may, for example, be an application specific integrated circuit (ASIC) which may be optimized for the particular application. Preferably, the ASIC includes mixed signal processing for both digital and analog signal processing. Control circuit 34 has inputs 36 that are coupled to the RTCU 20.

Control circuit 34 may be coupled to an analog-to-digital converter 36 through an input/output (I/O) port 38. Control circuit 34 may also have a plurality of command output ports 40. Command output ports 40 may include a low level pulse command output 42, a bilevel command output port 44, and a switch driver command output port 46 that is coupled to a switch driver 48.

To provide analog and bi-level telemetry, analog-to-digital converter 36 is coupled to a telemetry multiplexer 50 that is coupled to an analog/bilevel input 52. A current source 54 and current demultiplexer 56 may be coupled to analog/bilevel input 52 to allow the resistance of a resistive transducer (such as a temperature sensor) to be converted to an analog voltage and processed by the A/D converter.

The operation of control circuit 34 depends on the type of payload into which it is incorporated. The control circuit 34 generally will receive feedback from a particular payload device and control the operation accordingly. In the present example, feedback and control may be provided on the same interface 24. Embedded services module 26 may also include a linear regulator 58. Linear regulator 58 may be coupled to a power bus input 60. Linear regulator 58 may be used to provide power to embedded services module 26.

Figure 5:
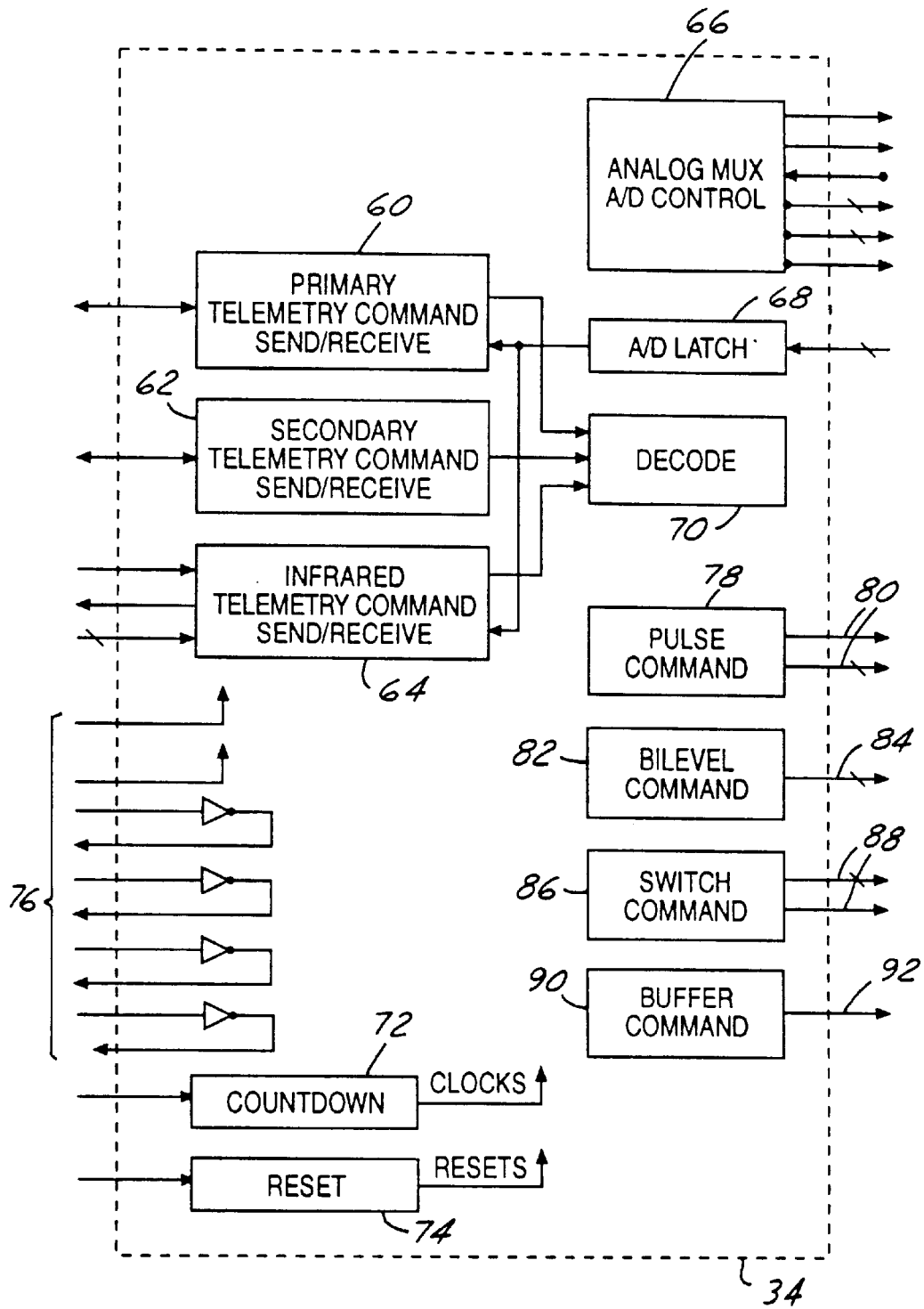
FIG. 5 is a block diagram of the ASIC of the embedded services module of FIG. 4.

Referring now to FIG. 5, a block diagram of an ASIC control circuit 34 is illustrated. Control circuit 34 may have a primary telemetry/command send/receive circuit 60, a secondary telemetry/command send/receive circuit 62, and an infrared telemetry/command send/receive circuit 64. In a preferred embodiment, primary circuit 60, secondary circuit 62, and infrared circuit 64 are all incorporated on the ASIC. However, for economy, one of primary circuit 60, infrared circuit 64 or secondary circuit 62 may be excluded from the circuit. However, for maximum commercial flexibility, it may be desirable to include all three circuits in control circuit 34.

Control circuit 34 may have various circuits to assist in the operation of primary circuit 60, secondary circuit 62, and infrared circuit 64 such as an analog multiplexer, an analog-to-digital controller 64, an analog-to-digital latch 68 and a decoder 70. A countdown input 72 and a reset latch 74 may also be included in control circuit 34. These circuits are commonly used in ASIC design. Control circuit 34 may also have a plurality of clock input/output (I/O) ports 76 for receiving and sending the clock signals.

Control circuit 34 also has a plurality of outputs including a pulse command circuit 78 having pulse command outputs 80, a bilevel command circuit 82 having a bilevel command output 84, a switch command circuit 86 having switch command outputs 88, and a buffer command circuit 90 having a buffer command output 92. Outputs 80, 84, 88, and 92 all provide a specifically formatted command output for various payload devices. Depending on the particular payload device, only one of the outputs may be required, however, to facilitate a broader design for various applications, several command circuits may be incorporated into control circuit 34.

Figure 6:
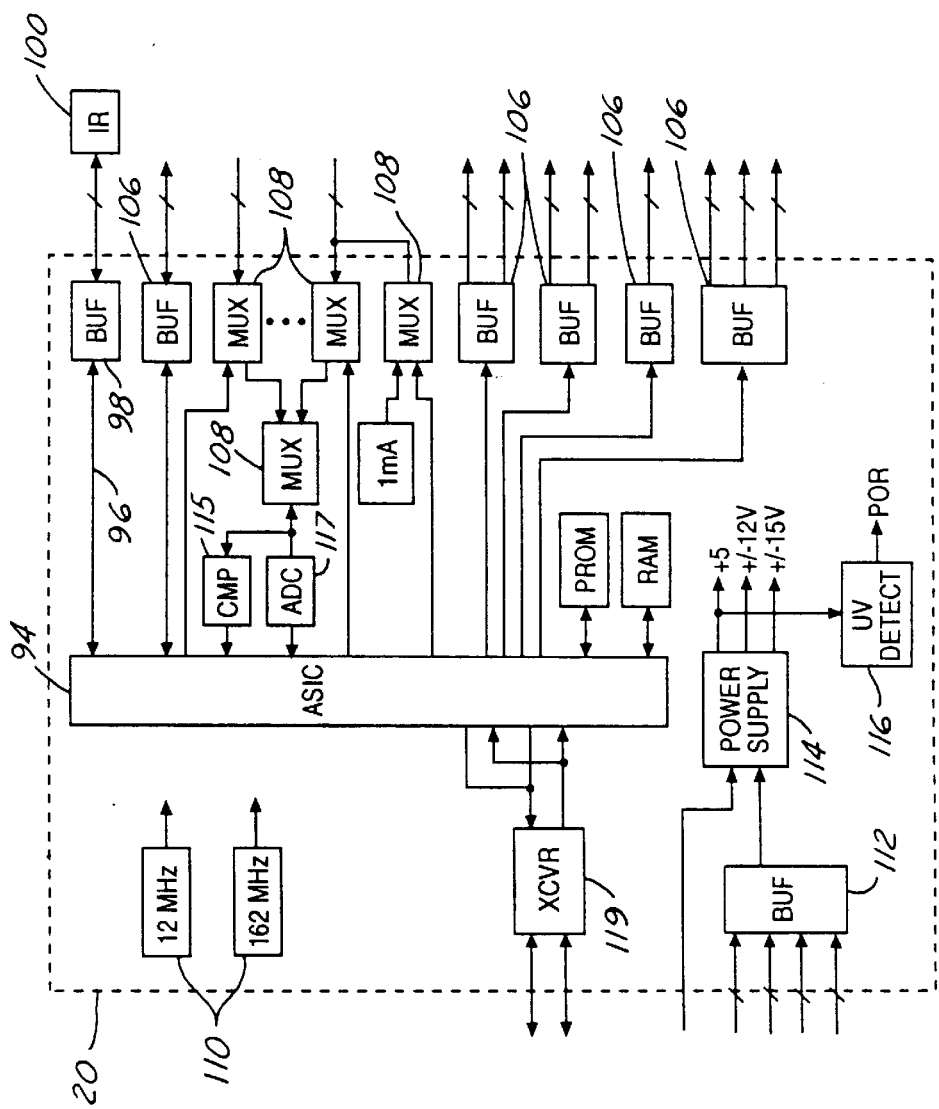
FIG. 6 is a block diagram of remote telemetry and command unit.

Referring now to FIG. 6, a conventional remote telemetry and command unit 20 is modified to accommodate the present invention. The heart of remote telemetry and command unit 20 is an ASIC 94 that has been modified to accommodate the improved functionality of the present invention. For example, an infrared I/O port 96 may be coupled to a buffer 98 which, in turn, is coupled to an infrared transceiver 100. ASIC 94, through infrared I/O port 96, buffer 98, and infrared transceiver 100, control the transmission and reception of infrared signals from a payload unit 22 as shown in FIG. 3.

Another addition to remote telemetry and command unit 20 is increased memory through the use of programmable read-only memory (PROM) 102 and random access memory (RAM) 104. PROM 102 and RAM 104 are used to store programming and protocol information.

Because remote telemetry and command unit 20 is a modification of known circuits, the functionality of the further devices will not be described. Various other buffers 106 and multiplexers 108 may be used to support the various functions of ASIC 94. Other devices such as clocks 110, a buffer 112, a power supply 114, a comparator 115, an ultraviolet detector 116, an analog to digital converter 117 and a tranceiver 119 may be incorporated in remote telemetry and command unit 20 in a conventional manner.

Figure 7:
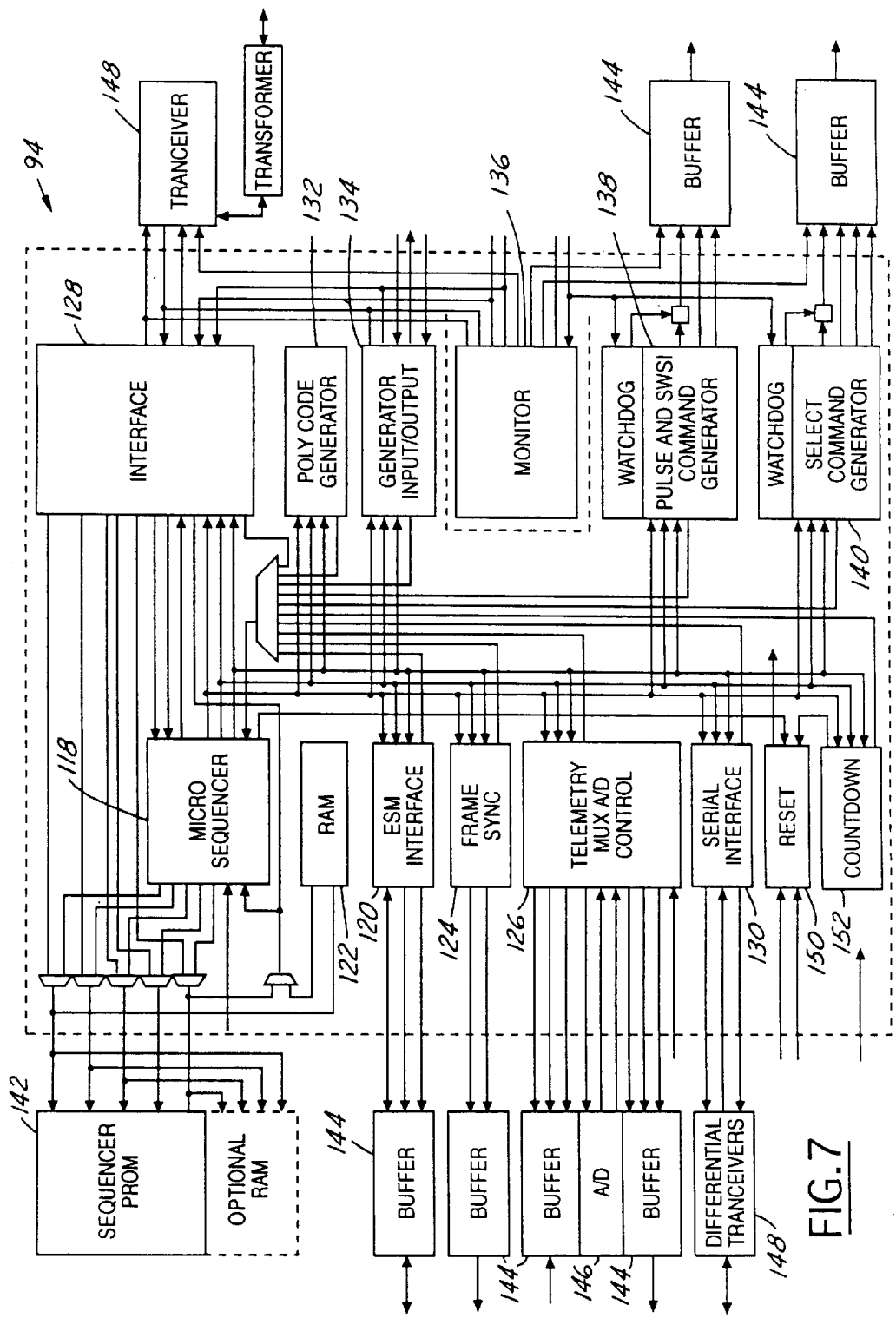
FIG. 7 is a block diagram of the ASIC of the remote telemetry and command unit of FIG. 6.

Referring now to FIG. 7, a high-level block diagram of ASIC 94 is illustrated. ASIC 94 may, for example, have a microsequencer 118, an ESM interface 120, RAM 122, a frame synchronizer 124, a telemetry multiplexer and analog-to-digital controller 126. An interface 128 and a serial interface 130 may be coupled to control the interface functions of ASIC 94. A polycode generator 132 and a generator input/output 134 may be used to generate specific commands. A monitor 136, watchdog circuit 138, and a second watchdog circuit 140 are be used to monitor the specific inputs and outputs of ASIC 94. ASIC 94 is coupled to other external devices such a PROM 142, buffers 144, an analog-to-digital converter 146 and transceivers 148.

ASIC 94 may also include a reset circuit 150 and a countdown circuit 152, which are commonly incorporated into ASIC designs.

In operation of ASIC 94, microsequencer 118 may be coupled to RAM 122 and interface 128 as well as PROM 142. Microsequencer 118 in combination with embedded services module interface 120, control the communications between ASIC 94 and the ESM 26 as shown in FIGS. 2 and 3 in the particular protocol required. Microsequencer 118 and ESM interface 120 may use a particular protocol for communications through interface 24. The other circuits of ASIC 94 monitor the communication signals through interface 24 for errors.

Figure 8:
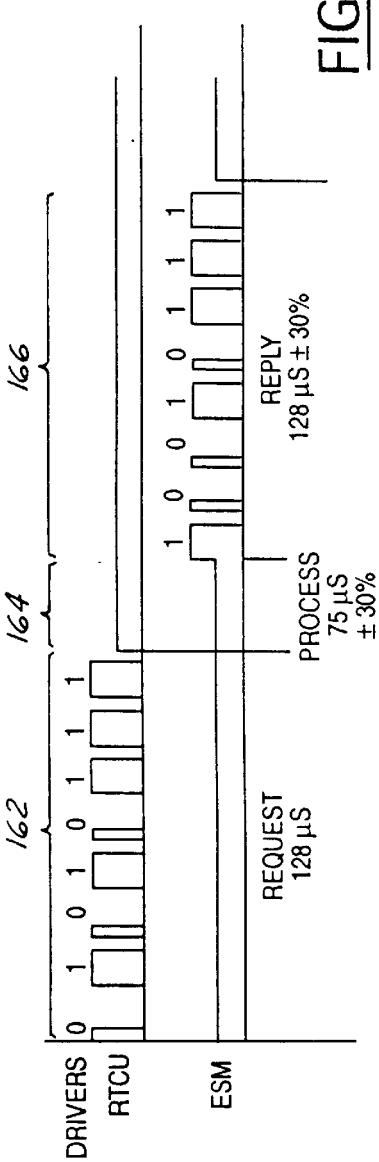
FIG. 8 is a timing diagram of a preferred communications protocol between a remote telemetry and command unit and embedded services module according to the present invention.

Referring now to FIG. 8, a timing diagram of the commands between remote telemetry and command unit 20 and payload unit 22 through interface 124 is illustrated. The present example illustrates a preferred method for communication. However, other communication protocols may be employed. In the present example, remote telemetry and command unit 20 initiates a request 162. The request is received by payload unit 22 and more specifically embedded services module 26 within payload unit 22. Request 162 is processed at time 164 where thereafter a reply 166 is generated from embedded services module 126. The embedded services module conditions, samples, digitizes, and encodes engineering and diagnostic data from ASIC 94 in response to request messages through interface 24. Embedded services module 26 accepts both analog and parallel bilevel data inputs.

While particular embodiments of the invention have been shown and described, numerous variations and alternate embodiments will occur to those skilled in the art. Accordingly, it is intended that the invention be limited only in terms of the appended claims.

What is claimed is:

1. A satellite comprising:

a telemetry and command controller;

a payload unit comprising at least one embedded services module, said at least one module comprising at least one circuit for controlling, sending, and receiving of information between said at least one payload unit and said at least one telemetry command controller; and a single bi-directional interface directly coupling to and enabling direct communication between said telemetry and command controller and said payload unit, said single bi-directional interface is associated with a single payload unit.

2. A satellite as recited in claim 1 wherein said single bi-directional interface comprises a single wire.

3. A satellite as recited in claim 1 wherein said single bi-directional interface comprises a first transceiver coupled to said telemetry and command controller and a second transceiver coupled to said payload unit.

4. A satellite as in claim 1 wherein said at least one embedded services module comprises:

a current source; and a current demultiplexer coupled to said at least one circuit and said current source;

said current source and said current demultiplexer enabling resistance conversion of a resistance transducer.

5. A satellite as in claim 1 wherein said at least one circuit is an application specific integrated circuit comprising a plurality of telemetry send/receive circuits.

6. A satellite comprising:

a telemetry and command controller;

a payload unit having an embedded services module, said module comprising a circuit for controlling, sending, and receiving of information between said telemetry command controller and said payload unit; and a single bi-directional interface directly coupling to and enabling direct communication between said telemetry and command controller and said payload unit.

7. A satellite as recited in claim 6 wherein said telemetry and command controller comprises an application specific integrated circuit.

8. A satellite as recited in claim 7 wherein said application specific integrated circuit comprises a microsequencer coupled to an interface.

9. A satellite as recited in claim 7 wherein said application specific integrated circuit comprises a watchdog circuit for monitoring operations of said application specific integrated circuit.

10. A satellite as recited in claim 6 wherein said single bi-directional interface comprises a single wire.

11. A satellite as recited in claim 6 wherein said single bi-directional interface comprises a first transceiver coupled to said telemetry and command controller and a second transceiver coupled to said payload unit.

12. A satellite as recited in claim 6 wherein said embedded services module comprises an application specific integrated circuit.

13. A satellite as recited in claim 12 wherein said application specific integrated circuit comprises output selected from a pulse command output, a bi-level command output, a switch command output, and a buffer command output.

* * * * *